United States Patent [19]

Ackermann et al.

[11] Patent Number: 5,460,776

[45] Date of Patent: Oct. 24, 1995

[54] PROCESS FOR PRODUCING CONNECTED SINTERED ARTICLES

[75] Inventors: Luc Ackermann, Herbeys; Henri Gueydan, Moirans, both of France

[73] Assignee: Sintertech, Courbevoie, France

[21] Appl. No.: 330,085

[22] Filed: Oct. 26, 1994

[30] Foreign Application Priority Data

Oct. 29, 1993 [FR] France ................... 93 13217

[51] Int. Cl.$^6$ ...................................................... B22F 5/00
[52] U.S. Cl. ................... 419/44; 419/26; 419/38; 419/39; 419/58
[58] Field of Search ..................... 419/26, 38, 44, 419/58; 29/413, 426.5, 888.09, 888.091, 888.092

[56] References Cited

U.S. PATENT DOCUMENTS

| | | | |
|---|---|---|---|
| 3,994,054 | 11/1976 | Cuddon-Fletcher et al. | 29/156.5 A |
| 4,754,906 | 7/1988 | Brovold | 225/103 |
| 4,993,134 | 2/1991 | Hoag et al. | 29/888.092 |
| 5,049,183 | 9/1991 | Saka et al. | 75/244 |
| 5,051,232 | 9/1991 | Summers | 419/27 |
| 5,109,605 | 5/1992 | Hoag et al. | 29/888.09 |
| 5,131,577 | 7/1992 | Hoag et al. | 225/96.5 |

FOREIGN PATENT DOCUMENTS

| | | | |
|---|---|---|---|
| 342800 | 11/1989 | European Pat. Off. | F16C 9/04 |

*Primary Examiner*—Donald P. Walsh
*Assistant Examiner*—John N. Greaves
*Attorney, Agent, or Firm*—Dennison, Meserole, Pollack & Scheiner

[57] ABSTRACT

The invention relates to a method of producing connected sintered articles obtained by breaking a unitary preform.

It is characterized in that:
a) a preform is pressed from powdered metals while imprinting in it a superficial groove (3) located in a plane for the purpose of subsequent breakage,
b) this preform is presintered in order to consolidate it mechanically, the preform however remaining brittle,
c) it is optionally compacted by recompression,
d) recesses for the members for the mechanical connection of the final parts are optionally machined in this preform,
e) this preform is broken into at least two parts,
f) final sintering is carried out,
g) the articles are cooled.

The invention is applicable in particular to the production of connecting rods and connecting rod covers or of annular articles with or without an undercut (broken in the axial plane).

11 Claims, 1 Drawing Sheet

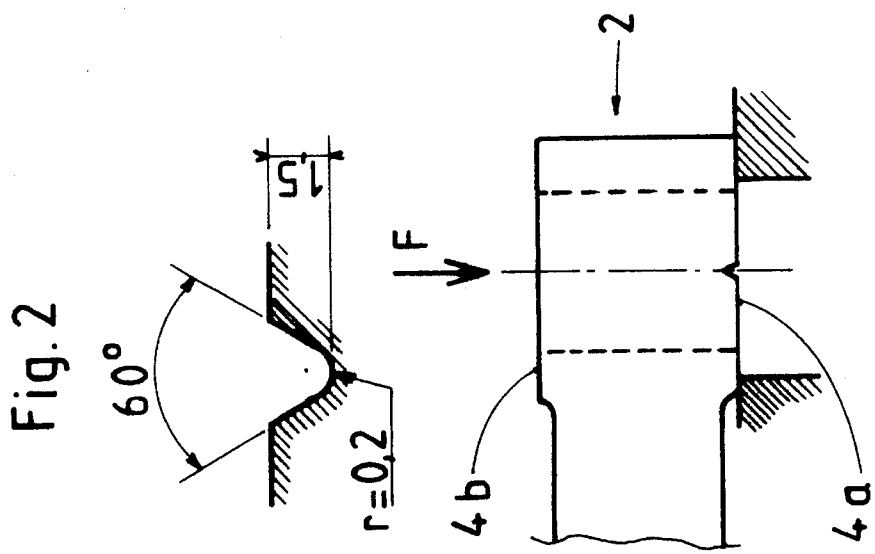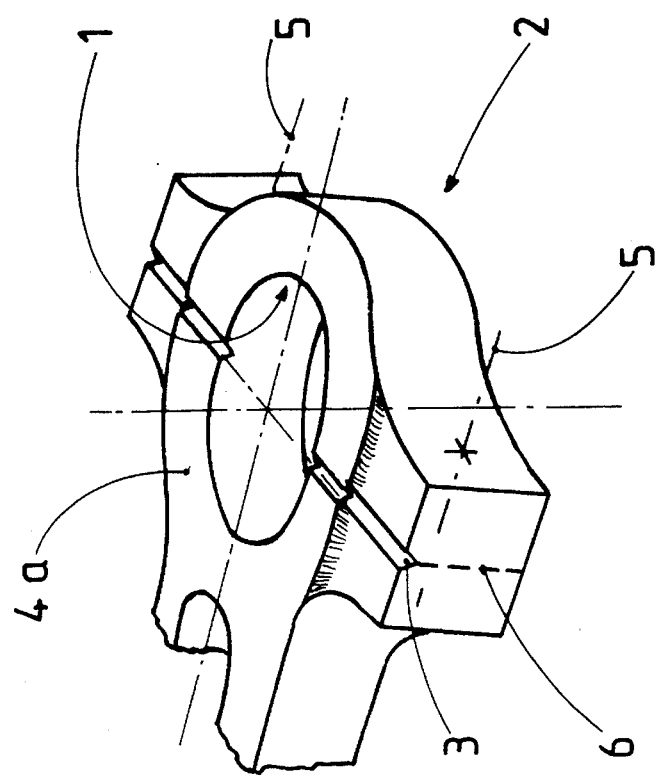

PROCESS FOR PRODUCING CONNECTED SINTERED ARTICLES

The invention relates to a method of producing connected sintered articles obtained by breaking a unitary preform.

The patent DE 3806236 C1 discloses a method of producing forged sintered articles obtained by breaking a preform. However, with this technique, the separating and machining operations are carried out on the finished article which is very hard and therefore involves powerful means and high costs. On the other hand, as the geometry of the break-initiating notch is modified by the forging operation, the break surface obtained is generally not plane. Finally, to produce this break virtually without plastic deformation, the material should not be tough.

The process according to the invention overcomes these three drawbacks.

According to the invention, the process involves:

a) pressing a preform from powdered metals while imprinting a superficial groove located in a plane for the purpose of the subsequent breakage, b) presintering this preform in order to consolidate it mechanically, the preform however remaining brittle, c) optionally compacting this preform by recompression, d) optionally machining in this preform, in particular by perforation and/or tapping, recesses for the members for the mechanical connection of the final parts, e) breaking this preform into at least two parts at ambient temperature, f) carrying out final sintering on these parts, g) cooling these parts.

These connected parts are then either assembled mechanically or simply juxtaposed.

The presintering conditions employed are such that the elongation under tensile stress of a sample according to French standard NF-A-95-322 but comprising in its centre a superficial notch which is perpendicular to its length, has a depth of 1 mm and a radius of curvature at the bottom of the notch of less than 0.5 mm measured over the entire length of the sample remains lower than 1%.

The preform is broken either by tensile stress or by bending. It is obtained with substantially plane breaking surfaces.

The bottom of the groove or imprint of the preform which is usually rectilinear preferably has, in cross section, a radius of curvature <0.5 mm and preferably <0.2 mm. This is obtained during compression of the powder with suitable tools.

The invention will be understood better by means of the following example relating to the production of a connecting rod and an associated connecting rod cover.

Example 1

A mixture of powdered metals having a composition by weight of 0.7% C; 4% Ni; 1.7% Cu; 0.8% Mo, remainder Fe and normal impurities was compressed under 700 MPa in the form of connecting rods, the foot of one of them being shown schematically in FIG. 1. A V-shaped groove 3 of which the geometry is shown in FIG. 2 has been imprinted in the axial plane of the bore 1 of the foot of the connecting rod 2 during compression on face 4a. It was then presintered at 850° C. for 20 minutes in an atmosphere containing 80% by volume of nitrogen and 20% by volume of hydrogen. This operation allows elimination of the compression lubricant without obtaining total compaction of the material.

They are then compacted by compression to obtain a density ≧7.4. In this state, the structure has few sinter bridges; it is mainly ferritic with a few islands of perlite.

The tensile strength on notched samples (notch shown in FIG. 2) is of the order of 150 MPa and the elongation at break is typically less than 1%. After machining of the screw recesses and corresponding tapping along the axes (5), the presintered connecting rods are broken by bending in the plane 6 by applying a force along the arrow F shown in FIG. 3 using a hydraulic press.

The two parts obtained are then sintered under the normal conditions (1120° C./30 min with the same atmosphere as presintering). This final sintering gives the articles their characteristics of mechanical strength and toughness which are suited to their use.

The invention has the following advantages over the prior art:

the machining of the recesses for the connecting members is carried out easily on a low strength, low toughness metal (obviously taking into consideration the known dimensional variations due to final sintering);

it is strange to note that even after sintering, the broken surfaces remain perfectly joined, avoiding, in particular, the phenomena of mutual dulling and/or fretting corrosion;

a single initial groove is necessary to obtain a virtually plane breakage surface;

a product which may be ductile and resilient after sintering is obtained.

The invention is applicable in particular to the production of connecting rods and connecting rod covers or of annular articles with or without an undercut, nuts, . . . (broken in the axial plane).

We claim:

1. A process for producing connectable sintered metallic articles, comprising the steps of:

a) pressing a preform from powdered metals, imprinting in said preform during said pressing a superficial groove in an outwardly directed external surface of said preform, said groove being located in a plane for the purpose of subsequent breakage;

b) presintering to consolidate the preform;

c) optionally compacting the consolidated preform by recompression;

d) optionally machining into the consolidated preform recesses to enable mechanical connection of said articles;

e) breaking the consolidated preform into at least two parts;

f) conducting a final sintering of each of the least two parts; and g) cooling the sintered parts to form said connectable metallic articles.

2. Process according to claim 1, wherein the articles obtained in g) are mechanically connected.

3. Process according to claim 1, wherein the breaking is performed by bending.

4. Process according to claim 1, wherein the breaking is performed by tensile stress.

5. Process according to claims 1, wherein the elongation at break under tensile stress of the presintered preform b) is lower than 1%.

6. Process according to claim 1, wherein the groove is rectilinear.

7. Process according to claim 1, wherein the machining operations essentially involve perforation and tapping.

8. Process according to claim 2 wherein the mechanically connected articles are a connecting rod and connecting rod cover.

9. Process according to claim 1, wherein said groove has a predetermined length, and the breaking is performed by applying a force in a direction perpendicular to the length of the groove.

10. Process according to claim 1, wherein the groove has a bottom portion having a radius of curvature (r) smaller than 0.5 mm.

11. Process according to claim 10, wherein the radius of curvature is smaller than 0.2 mm.

* * * * *